No. 644,193. Patented Feb. 27, 1900.
R. R. STONE.
CHURN.
(Application filed Nov. 18, 1899.)
(No Model.) 2 Sheets—Sheet 1.
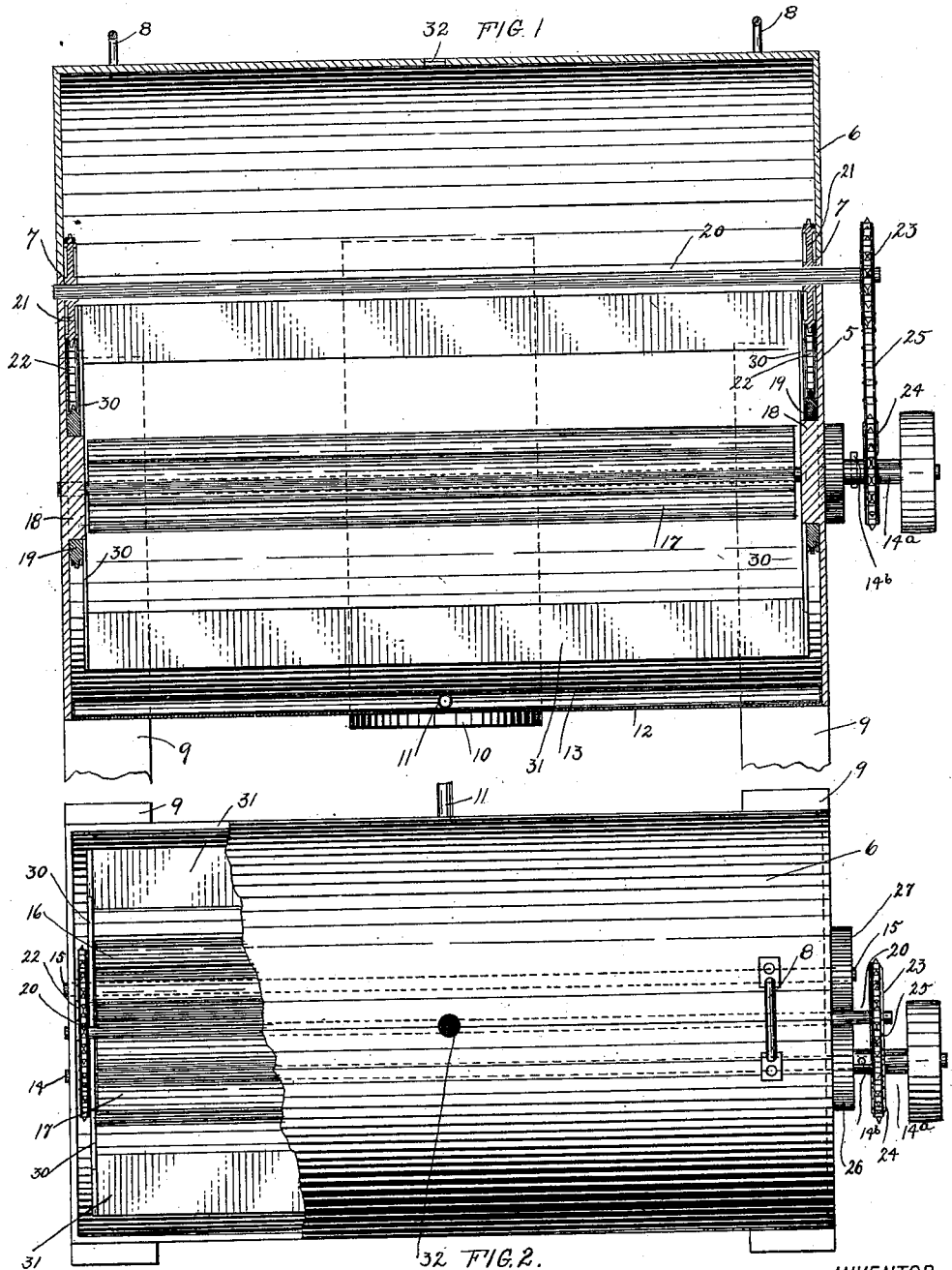
WITNESSES
INVENTOR
Reuben R. Stone
BY
Edgar Tate & Co
ATTORNEYS.

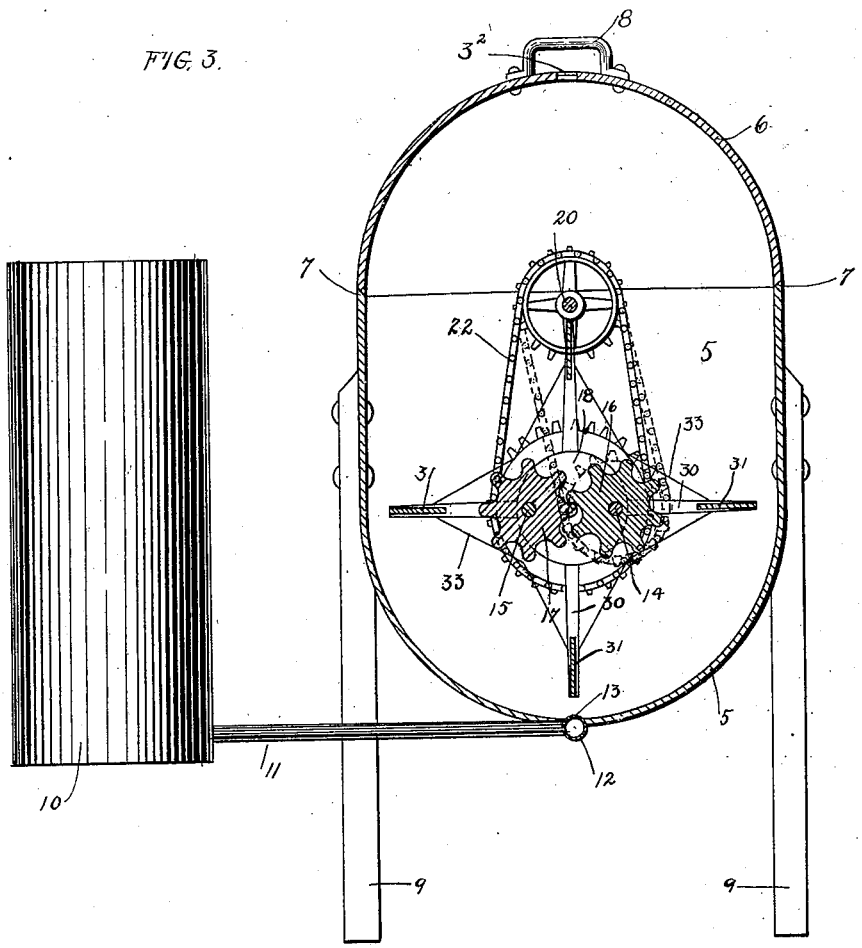

UNITED STATES PATENT OFFICE.

REUBEN R. STONE, OF NEW YORK, N. Y.

CHURN.

SPECIFICATION forming part of Letters Patent No. 644,193, dated February 27, 1900.

Application filed November 18, 1899. Serial No. 737,391. (No model.)

*To all whom it may concern:*

Be it known that I, REUBEN R. STONE, a citizen of the United States, residing at New York, in the county of New York and State of New York, have invented certain new and useful Improvements in Churns, of which the following is a full and complete specification, such as will enable those skilled in the art to which it appertains to make and use the same.

This invention relates to churns; and the object thereof is to provide a churn positive and efficient in operation and in which butter will be formed with increased expedition and ease, the main advantages being that concentration of the cream in clots and lumps is avoided and the cream during agitation is thoroughly aerated.

My invention consists in the construction and arrangement of parts as fully hereinafter set forth.

In the accompanying drawings, forming part of this specification, in which like reference characters denote like parts in the several views, Figure 1 is a sectional side elevation of a churn constructed according to my invention, the operative parts being mainly shown in full lines; Fig. 2, a plan view thereof, one element being omitted and the casing being partially cut away; and Fig. 3, a sectional end elevation thereof.

In the practice of my invention I provide a churn-casing 5, preferably of the form shown, and of which the cover 6 is seated upon the casing by a beveled joint, as at 7, and is provided at the top with handles 8. The casing 5 rests upon suitable supports 9. A compressed-air tank 10 is arranged adjacent the casing 5 and communicates therewith by means of a pipe 11, which communicates with an elongated nozzle 12, perforated at the top at 13 and communicating with the casing 5 at the bottom thereof by means of said perforations.

Passing longitudinally through the casing 5 is a suitably-impelled main shaft 14, and mounted similarly and parallel thereto is a supplemental shaft 15.

Mounted upon each of the shafts 14 and 15, within the casing 5, is a longitudinally-fluted roller, respectively 16 and 17, and said rollers intermesh within the casing. Within the casing 5 and at each end thereof is fixed a circular bearing 18, provided with a revoluble circular gear-rack 19, and in the upper portion of the casing 5 is mounted a longitudinal shaft 20, which is provided within said casing and at each end thereof with a sprocket-wheel 21, which is operatively connected with the adjacent gear 19 by a chain 22. At one end of the casing the shaft 20 is provided with a sprocket-wheel 23, which is geared, in connection with a sprocket-wheel 24, upon a short shaft $14^a$ by means of a sprocket-chain 25. The short shaft $14^a$ is hollow at one end and passed upon the projecting end of the shaft 14. A clutch-pin $14^b$ passes through registering openings in the shafts 14 and $14^a$ to operatively connect the latter. The shaft $14^a$ constitutes the power-shaft, and by means of the clutch-pin $14^b$ the rollers 16 and 17 may be disconnected from the power-shaft $14^a$.

Each of the shafts 14 and 15 is provided with a gear-wheel, respectively 26 and 27, which intermesh at the end of the casing adjacent the sprocket-wheel 24.

The circular racks 19 are provided each with radial arms 30, with the outer ends of which are connected paddles 31, which are arranged longitudinally of the casing 5. In the cover 5 and centrally thereof is formed a screened opening 32. Stay-wires 33 are connected with the racks 19 and the paddles 31.

The operation of my improved churn will be evident from the foregoing description, taken in connection with the accompanying drawings. Air is admitted to the casing 5 through the nozzle 12, and any suitable means for controlling the supply of air may be employed. With the parts in the position shown in the drawings if the power-shaft $14^a$ be operated the rollers 16 and 17 will be revolved and interoperate within the casing. The shaft 20 will also be revolved by the sprocket-chain 25 and the gears 19 by the sprocket-chains 22, setting the paddles 31 into revolution. The contents of the casing will thus be submitted to three influences—first, aeration by the upward passage of air through the mass from the nozzle 12; second, thorough agitation by the paddles 31, and, third, maceration or grinding by the meshing fluted rollers 16 and 17. It is evident that the aeration and agitation and also the agitation alone may take place without the maceration, as the collars 16 and 17 may be operatively disconnected by means of the clutch-pin 14$^b$. When these three operations are simultaneous, the agitation of the paddles 31 causes a more thorough commingling of the air with the contents of the casing, and the clotted or lumped portions of the latter are thrown between the rollers 16 and 17, which thoroughly grind up or reduce the same.

I do not limit myself to the precise construction and arrangement of parts above specified, but reserve the right to vary the same within the scope of my invention.

Having fully described my invention, I claim as new and desire to secure by Letters Patent—

1. A churn, comprising a casing, agitating-paddles revolubly mounted therein, macerating-rollers revolubly mounted therein, means for operating said paddles and rollers, and devices for disconnecting said rollers and said paddles, substantially as shown and described.

2. A churn, comprising a casing, a pair of shafts passed longitudinally therethrough, and each provided with a fluted roller, which rollers intermesh, a revoluble element operatively mounted at each end of said casing and provided with radial arms, paddles secured to said arms and arranged longitudinally of said casing, the relative arrangement being such that said paddles revolve around said rollers, means for revolving said paddles and said rollers, and means whereby said paddles and rollers may be disconnected, substantially as shown and described.

3. In a churn provided with a casing, means for admitting air under pressure at the bottom of said casing revoluble agitating means operating in a circular path in said casing, and revoluble macerating means operating within the circle of the path of agitating means, substantially as shown and described.

4. In a churn, provided with a non-rotatable casing, means for admitting air under pressure at the bottom of said casing, consisting of an elongated perforated nozzle in communication with said casing, and a supply-tank in communication with said nozzle, agitating means and macerating means mounted in said casing, and devices for actuating said means independently or in unison, the relative construction and arrangement of parts being such that said air under pressure first mixes with such contents of said casing as are directly agitated, substantially as shown and described.

In testimony that I claim the foregoing as my invention I have signed my name, in presence of the subscribing witnesses, this 17th day of November, 1899.

REUBEN R. STONE.

Witnesses:
 F. A. STEWART,
 V. M. VOSLER.